March 31, 1931.   G. O. CARTER ET AL   1,798,190
METHOD OF BUILDING WELDED TANKS AND OTHER MULTIPLATE STRUCTURES
Filed June 6, 1925   7 Sheets-Sheet 2

Glenn O. Carter
Robert B. Aitchison
Matthew J. Wall
INVENTORS

BY Hypnes Townsend + Brickenstein
ATTORNEYS.

March 31, 1931.   G. O. CARTER ET AL   1,798,190
METHOD OF BUILDING WELDED TANKS AND OTHER MULTIPLATE STRUCTURES
Filed June 6, 1925   7 Sheets-Sheet 3
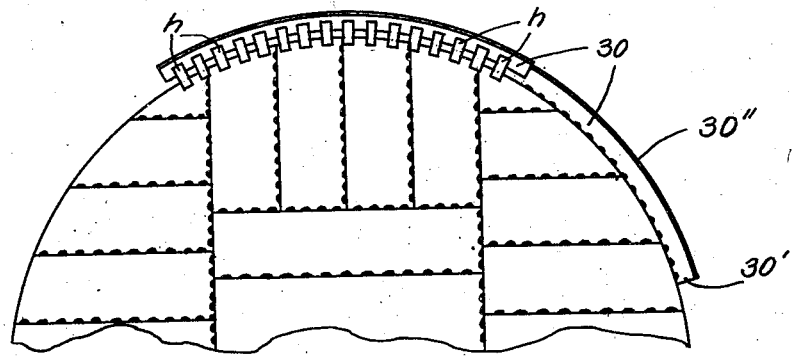
Fig. 6.
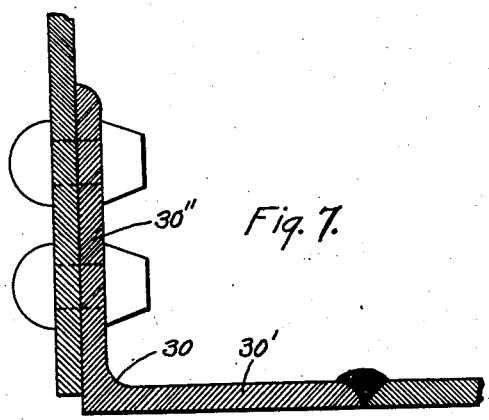
Fig. 7.
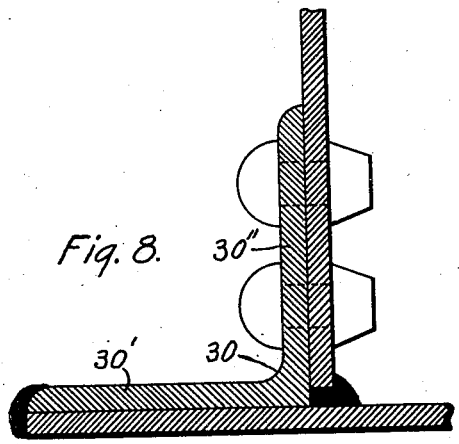
Fig. 8.
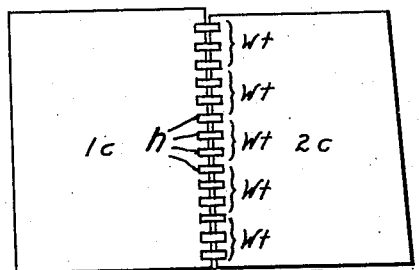
Fig. 11.
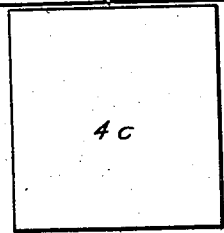
Glenn O. Carter
Robert B. Aitchison
Matthew J. Wall
INVENTORS
BY Reynues Townsend Brickenstein
ATTORNEYS.

March 31, 1931.    G. O. CARTER ET AL    1,798,190
METHOD OF BUILDING WELDED TANKS AND OTHER MULTIPLATE STRUCTURES
Filed June 6, 1925    7 Sheets-Sheet 4

Glenn O. Carter
Robert B. Aitchison
Matthew J. Wall
                INVENTORS

BY
                ATTORNEYS.

March 31, 1931. G. O. CARTER ET AL 1,798,190
METHOD OF BUILDING WELDED TANKS AND OTHER MULTIPLATE STRUCTURES
Filed June 6, 1925 7 Sheets-Sheet 6

Glenn O. Carter
Robert B. Aitchison
Matthew J. Wall
INVENTORS

BY
ATTORNEYS.

March 31, 1931. G. O. CARTER ET AL 1,798,190
METHOD OF BUILDING WELDED TANKS AND OTHER MULTIPLATE STRUCTURES
Filed June 6, 1925 7 Sheets-Sheet 7

INVENTORS
Glenn O. Carter
Robert B. Aitchison
Matthew J. Creel
BY
ATTORNEYS.

Patented Mar. 31, 1931

1,798,190

UNITED STATES PATENT OFFICE

GLENN O. CARTER, OF NEW ROCHELLE, AND ROBERT B. AITCHISON, OF GREAT KILLS, NEW YORK, AND MATTHEW J. WALL, OF JERSEY CITY, NEW JERSEY, ASSIGNORS TO THE LINDE AIR PRODUCTS COMPANY, A CORPORATION OF OHIO

METHOD OF BUILDING WELDED TANKS AND OTHER MULTIPLATE STRUCTURES

Application filed June 6, 1925. Serial No. 35,383.

This invention relates to the construction of welded metal tanks used for storing oil, gas and for many other purposes. While the improved procedures and constructions here-in disclosed are particularly applicable to tanks of such size as to require many plates in the bottom and crown and several rows of plates in the side, it will be understood that the principles of this invention may be used to advantage in various other structures where parts are united by welding.

Heretofore, in the construction of larger tanks by welding plates together, buckling of the plates, particularly in the bottom and crown, has been the source of considerable trouble. It has been the usual practice in flat butt welding to lay the metal sheets or plates, of about ¼″ gage and varying in area from about 10 square feet up to 50 square feet and more, onto some support so that the edges to be welded together touch at one corner but are open at the other corner a distance which approximates ⅛″ to ¼″ per foot of length of seam. Upon applying the welding flame of an oxy-acetylene torch, an electric welding arc or other suitable heating means along the seam, with addition of welding metal, as the welding progresses lengthwise of the seam from the end thereof where the plates are in contact, the cooling and contraction of the heated plates and the deposited metal pulls the plates together at the open corner so that ultimately the plates lie substantially parallel. This method works fairly satisfactorily on single seams but when all four edges of a plate are similarly welded, the contraction is so excessive and unequal that this plate as well as adjoining plates buckle badly, with ultimate weakening of the completed tank. Moreover, preliminary tacking and subsequent welding throughout the length of a seam between two sheet metal plates has heretofore been done by only a single welder, starting at or near one end of the seam and applying the weld metal in spots as tacks successively lengthwise of the seam. In such procedure, the contraction of the short welds or tacks and the heated plates produces such stresses along the seam that the unwelded plate edges transverse of the seam are distorted, become bow-shaped, and fail to match with the edges of other plates to be welded thereto. Such distortion requires re-cutting of the plates along the unwelded edges and becomes increasingly troublesome when several or all edges of a plate are tacked or welded in this way. Furthermore, when a tank bottom for example, is completely welded and cut to the correct circumference and the curb is welded thereto, the buckling of the bottom is further aggravated.

The principal object of this invention is therefore to provide a method of welding whereby the above-mentioned objections shall be avoided, and whereby welded tanks and other structures may be built more economically and expeditiously, and without excessive buckling or other troublesome distortion of the bottom, side, and crown sheets and other parts thereof.

In accordance with one important feature of this invention the plates of the bottom are first tack welded together in sections, then the sections are tack welded together to form a tacked bottom of substantially final form, and the tacked bottom is tack welded around its perimeter to a curb ring having the bottom row of side plates secured thereto; whereupon the bottom plates, thus anchored, are completely welded together. This procedure avoids cumulative distortion of the bottom as the work progresses, which would cause very pronounced buckles or large gaps between the bottom sections. The initial tacking strains are localized, and the final welding strains are resisted and evenly distributed by the rigid anchorage formed by the surrounding curb ring in conjunction with the unitary character of the tacked bottom.

Another important feature of the invention relates to the method employed in tack welding plates to avoid buckling and other distortion of the plates during tacking. In accordance with this feature the seam between two plain or straight-edged plates is tacked throughout its length simultaneously at a number of substantially equally spaced points by a gang of welders working lengthwise of such seam. Secondary tacks are then simultaneously made by these welders throughout the length of the seam between the first or primary tacks. This practice eliminates much of the strain which results when the tacks are made successively by one man and results in a localization of unavoidable stresses, so that distortion is substantially reduced. By depositing the fused weld metal simultaneously at a plurality of separated points throughout the length of the contiguous plain or straight edges, the weld metal at each of such points is practically at the same temperature from the time the deposits are applied to the time they become cold. Since these deposits are along substantially straight or plain edges, the contraction at all points along the seam will be uniform and along parallel lines normal to the seam; that is to say, each deposit contracts in a direction substantially perpendicular to the seam and parallel to and simultaneously with all other cooling deposits, so that stresses and distortion, such as those produced in prior practice by depositing weld metal successively along a seam and along irregular edges, are substantially eliminated.

When welding a tank bottom for example the same procedure is followed in tacking all of the bottom seams whether such seams occur at the junction of two individual plates or at the junction of plate sections composed of a plurality of tacked-together plates. Furthermore, in tacking such sections together three plate edges are preferably united so as to form T's rather than joining four plate edges as a cross. After completing the tacking of the bottom plates and sections, and tacking the curb thereto, the welding of the bottom may proceed by simultaneously gang welding from 18 inches to two feet of all seams crossing the bottom along a given line. The general principles followed in welding the bottom of a tank are also applicable to the welding of the crown, except that as crowns often have an appreciable rise it is usually better to make the crown in sectors, with the plate layout of adjacent sectors of sufficient difference to avoid four plate edges meeting in a cross.

Other features of the invention relate to improved methods devised for welding the side plates. According to prior practice, a side plate was suspended from a boom with one corner resting on the surface or edge to which it was to be welded, with its lower edge inclined approximately 1/8" to the foot. As the welding progressed from the lower corner, the plate was lowered to keep an approximately uniform angle between the edges forming the seam. As the welding of the first plate was being completed the second plate was welded to the first one at the end, one corner of the second plate being in contact with the opposite corner of the first plate and the vertical seam being open and tapering to allow for contraction. After the first plate had been completely attached, the second plate was attached by the same procedure, and the work was thus continued until the ring of plates was completed and welded to the curb or to a previously welded ring below it. By following this procedure, only one man is able to work on a row of plates at a time, which slows the work and leaves idle some of the welders who were required for the bottom and crown work. According to the present invention, after the plates have been bolted together as complete rings or portions of rings, the side plates may be first tacked at their bottom edges to the row previously welded as in the gang tacking procedure already described, then the vertical seam may be welded, and finally the horizontal seam may be completely gang welded by men welding about two foot sections along the seam; or the plates may be attached by gang tacking at their lower edges to the plates already welded, then welding said seam by gang welding methods, followed by the welding of the vertical seam.

The above and other objects and the novel features and advantages of this invention will be apparent from the following description, taken with the accompanying drawing, in which Fig. 1 is a plan view of a tank bottom, showing the plate sections assembled and partly tacked together;

Fig. 6 is a view of a tacked and trimmed tank bottom, the curb thereof being assembled and tacked thereto;

Figs. 7 and 8 are views showing different methods of securing the curb and tank side to the bottom;

Figs. 11 and 12 are views showing the procedure of assembling and tacking plates of a tank roof or crown section;

Figure 17:
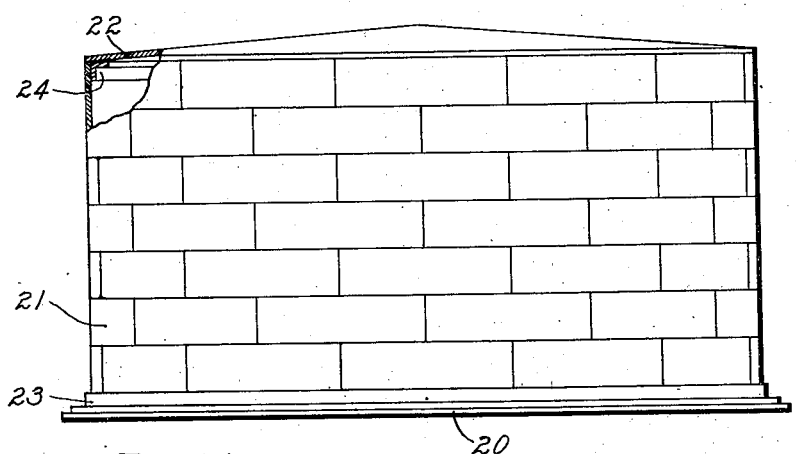
Fig. 17 is a side elevation of a completely welded tank.

Referring to Fig. 17, the welded tank as shown comprises a circular bottom 20, a cylindrical side wall 21, and a circular roof or crown 22, each made up of numerous large sheet metal plates of about ¼ inch gage. The bottom and the side wall are desirably permanently united by an intermediate sectional angle-iron curb ring 23, that is welded to the outer margin of the bottom. In a closed tank the side wall 21 and the crown 22 may be united by a similar curb ring 24, while in a gasholder the crown is the top part of a bell having its cylindrical side wall telescoping inside a water seal tank built up of a bottom and a side.

Figure 1:
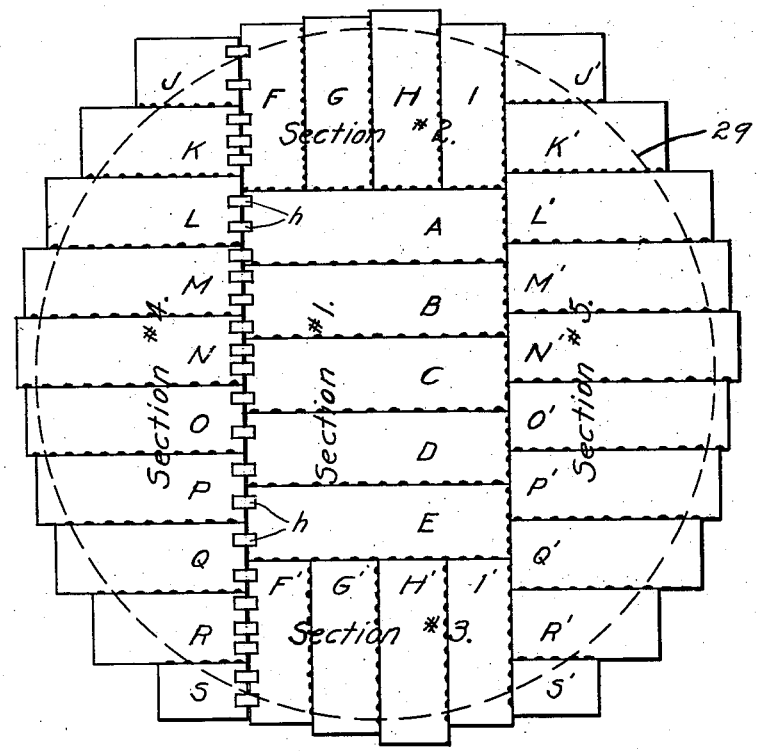
Figure 2:
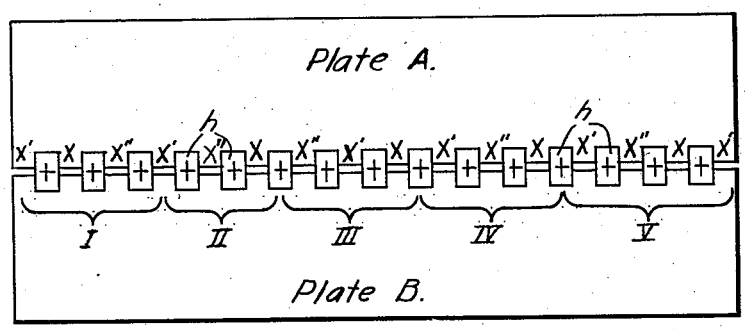
Fig. 2 is a view showing how the plates of the bottom sections are assembled and tacked to one another.
Figures 3, 4:
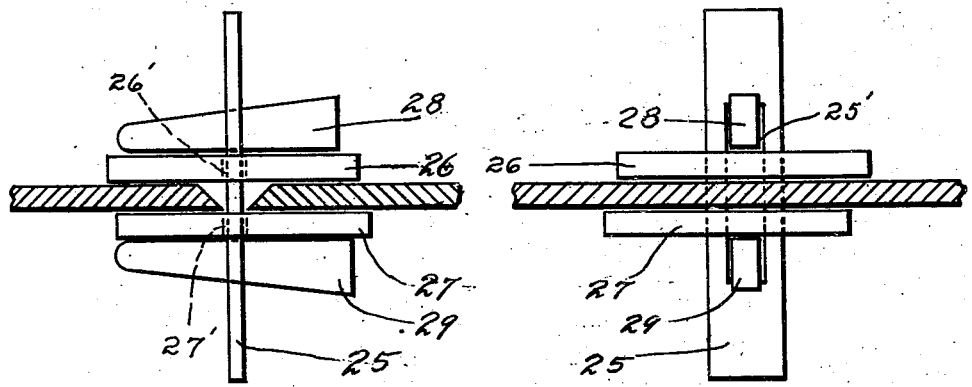
Figs. 3 and 4 are end and side views of an improved plate alining clamp.
Figure 5:
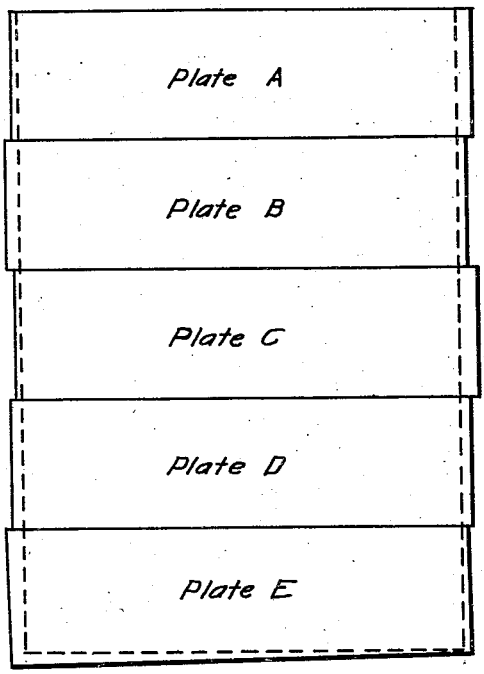
Fig. 5 is a view of a section of plates tacked together and ready for trimming.

As shown in Figs. 1, 2 and 5, the improved tank bottom is desirably built up of a number of sections, each consisting of a plurality of substantially rectangular sheet metal plates. While plates up to ¼" gage having square sheared edges may be securely welded, in preparing the plates for tank bottoms and crowns, it is advantageous to bevel shear the long sides to about a 45° bevel, leaving the short sides for cutting and beveling in line with oxy-acetylene or similar torches. As shown in Fig. 2, the plates of a section are first lined up on supports such as horses by riggers; the longer opposed beveled edges of two adjoining sheets being separated by a space of ⅛" to ⅜". Suitable devices may be used to clamp the plates in position, such as H clamps h, shown in Figs. 3 and 4. These clamps may consist of a thin key plate 25, slotted at 25' and projecting through the space between the bottom plates and also through alined slots 26' and 27' in the top and bottom cover plates 26 and 27. The key plate slot 25' is of sufficient length to receive top and bottom keys or wedges 28 and 29 having edges bearing against the ends of the slot 25' and against the surfaces of the cover plates 26 and 27 to aline and clamp the section plates when the keys are driven in place. Various other types of clamps and alining devices may of course be used.

After two plates A and B have been fitted and clamped together with their accuracy as indicated in Fig. 2, the seam is gang tacked. A gang of welders, five in the illustrative example, are stationed at approximately equal intervals along the seam, as at I, II, III, IV, V, and, working at the same time, make first or primary tacks at $x$. This tacking and subsequent tacking and welding may be accomplished in the well known manner of fusion welding with oxy-acetylene or similar torches, desirably with the addition to the seam of fused metal from a welding rod held in the torch flame. However, electric arc and equivalent welding means may be employed instead of the torch. Also, while it is preferable to bevel cut the plates to size for butt welding when using steel or other ferrous welding rod for filling material, the principles of this invention may be applied to square edged plates; and also to lapped plates. Moreover, bronze welding methods may be employed, such as described in application Serial No. 709,690, filed April 28, 1924 in the name of Glenn O. Carter, wherein a non-ferrous composition welding rod may be used as the fusible welding material. Tack welding, as here employed, consists in fusion depositing at intervals throughout the length of a seam small lumps or masses of weld metal forming tacks to hold two plates together preliminary to the final welding that produces a continuous autogenous joint between the plates. After the primary tacks, the welders, still working in unison or approximately simultaneously, make secondary tacks at $x'$ beside and between the primary tacks, and further supplementary tacks $x''$, etc., are made simultaneously until the welders have tacked all accessible points, alternating from side to side of their respective zones, placing the tacks from 4" to 6" or more apart, depending on the gage of the metal, etc. During such tacking depressed or bulging parts along the seam are leveled, since close and level tacking eliminates substantially all inequalities and permits fast welding later. When the seam has been tacked except where held by the clamps, the latter may be removed simultaneously and the tacking is then completed, the welders still working simultaneously at their several stations.

In this gang tacking procedure, all the stresses from the primary tacks are in a direction perpendicular to the seams between the plates, and the stresses from the secondary tacks are probably more complicated, but as the plates are tightly held by the first tacks, the stresses from the secondary tacks are necessarily locked up, preventing serious distortion. The uniform stresses in the seam do not distort the plates or the edges perpendicular to the seam, hence such plates may be lined up with and similarly tacked to other plates without particular trouble. On the other hand, when only a single welder is making tacks, the first tack near one end may be assumed to be pulling the plates together perpendicular to the seam. When he makes the next tack along the seam, the point already tacked acts as a fulcrum and curved stresses are set up about the first tack as a center and on each side thereof. When the second and subsequent successively made tacks cool, the contraction pulls and distorts the plates so that the edges perpendicular to the seam become bow-shaped and the plates buckle.

While the welders have been tacking the plates A and B together, the riggers clamp the next plate, C, in position with one of its beveled long edges opposed to the untacked long edge of the plate B; and the same procedure is followed in gang tacking the plates C and B together. The number and size of plates used depends, of course, upon the size of tank to be built. In the illustrative example, and as shown in Figs. 1 and 5, the procedure already described is continued until the plates A, B, C, D and E have been tacked together as center section No. 1. The edges to be tacked together need not be exactly parallel, as each section of plates may be marked off and bevel cut with an oxy-acetylene cutting blowpipe or other means along its edges which are to matched with and gang tacked to other sections. For example, the center section shown in Fig. 5 may be marked off and bevel cut along the dotted lines so that its four edges will be substantially perpendicular to one another.

The groups of plates F, G, H, I; F', G', H', I'; J, K, L, M, N, O, P, Q, R, S; and J', K', L', M', N', O', P', Q', R', S', may be gang tack welded together to form sections 2, 3, 4 and 5 respectively, in the manner already described. Three of the edges of the sections 2 and 3 may be then marked off and bevel cut, the edges extending across the ends of the several plates of each of these sections being then gang tack welded to the edges of the end plates A and E, respectively, of the center section 1, following the tacking procedure already described. If now the outside edges of sections 2 and 3 are not in line with the untacked edges of section 1, the edges are checked and trimmed so that they will fit evenly along the bevelled edges of sections 4 and 5, to which they are tacked by the gang tacking procedure already described.

After the sections of the bottom have been tack welded together, the desired circumferential line is marked, as indicated by the dotted line 29 of Fig. 1, and the bottom is bevel cut along this line with a gas torch. Then the sections of the curb ring 30 may be bolted, rivetted or otherwise secured to side plates and thereupon gang tack welded along the perimeter of the bottom, as indicated by Fig. 6. Figs. 7 and 8 illustrate methods of doing this, the one illustrated in Fig. 7 being preferable. As shown, the angle-iron curb section has its horizontal leg 30' placed opposite the outer edge of the bottom and gang tack welded to the latter by a plurality of welders working simultaneously, as in tacking the plates together. Instead of butt welding the edges of the bottom and curb, as in Fig. 7, the curb ring may be disposed with its horizontal leg outside and resting upon the bottom with the edges of the curb and bottom substantially coinciding. Here, the curb is first gang tacked along the inside between it and the bottom, and then along the adjoining outside edges of the curb and bottom, the curb being held onto the bottom with suitable C clamps disposed along the two coinciding edges.

When the curb has been completely tacked in place, the ends of the curb sections may be welded to each other. Next, welds approximately two feet long are made simultaneously along all seams on a given line crossing the tank, then welds are similarly simultaneously made along a line perpendicular to the first, which results in strapping one side of the tank to the other and minimizes local stresses. After two such welded straps have been completed, the welders work simultaneously along prearranged lines so as to lock in place as many plate corners and meeting points of seams with the curb as is feasible. After the seams have been thoroughly locked together, the welding may proceed to completion, preferably no more than about three feet being welded in any one place at any one time, the welders moving from section to section in order to localize the stresses.

Figure 9:
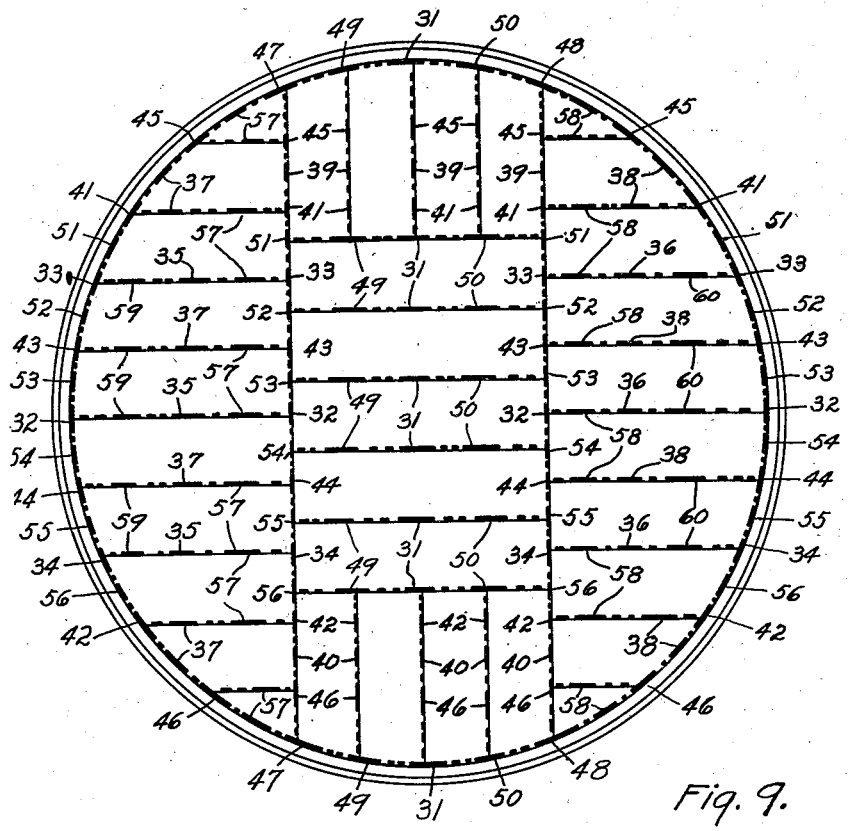
Fig. 9 is a view of a tacked tank bottom, illustrating the procedure in welding the same.

The welding procedure as applied to the tank bottom may be better understood by referring to Fig. 9 in which the two foot welds are made simultaneously at all points marked 31 if eight welders are available, otherwise as many of these points as possible are welded at one time, and then the remainder are welded. Thereupon, the welds at 32 are simultaneously made by gang welding, and so on until all the groups of points through 60 have been welded. In this way all meeting points of seams are first welded, then all central sections of the seams are welded, leaving only short unwelded seam sections which the welders may similarly fill in to complete the welding of the bottom, so arranging their work as to let each weld cool before welding near it. Of course, some seams or welding lines may not be long enough to permit a large gang of welders to work at one time, but it is desirable that at least three welders simultaneously cooperate in the tacking, as well as welding, operations.

Figure 10:
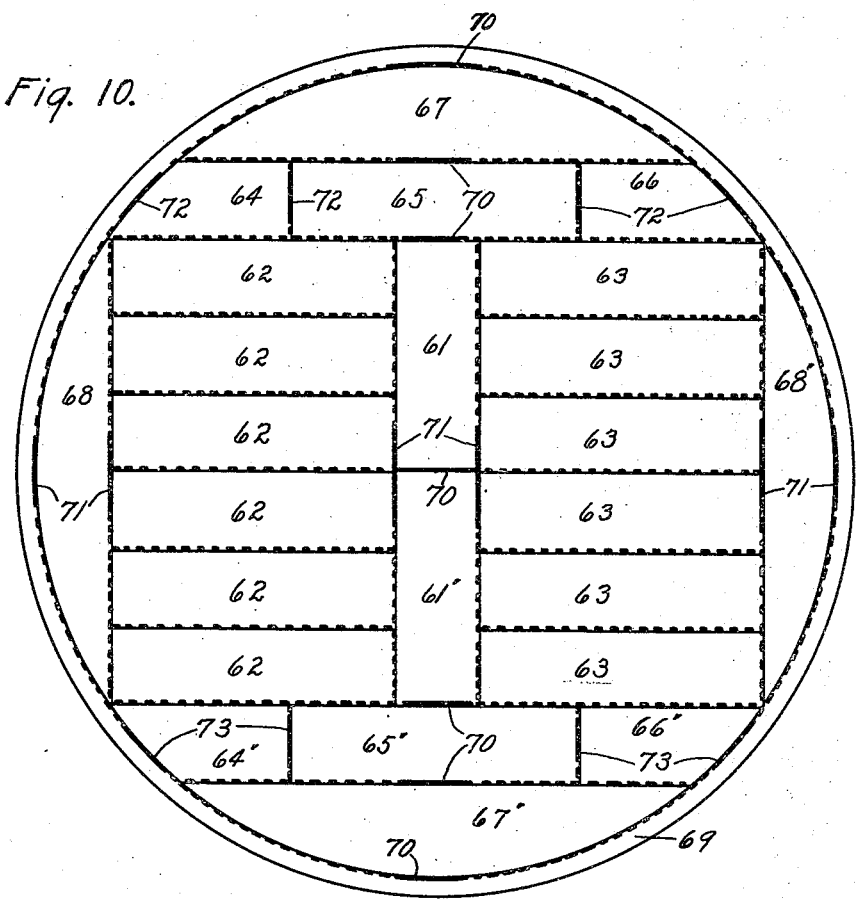
Fig. 10 is a view of a tank bottom of a different pattern, tacked and partially welded.

The principles of this invention may be applied to the welding of plate layouts of various patterns. Fig. 10, for example, shows a completely tacked and partially welded bottom of a different pattern from that just described. In this form the same procedure of gang tacking and gang welding already described is employed, each seam being tacked by first simultaneously making a series of primary tacks at substantially equally spaced points, and then making secondary and intermediate tacks until all of the tacks along a seam have been made. After the several multi-plate sections have been assembled by tacking, the method of building up the complete multi-section structure may proceed as follows: A section consisting of plates 61, 61' is joined by gang tacking, as described, to sections consisting of plates 62 and 63, and the resulting large section is gang tacked to end sections made up of plates 64, 65, 66, after which plates 67 and 68 may be similarly joined on. The tacked together sections may be cut or trimmed to the proper circumference, to which the curb 69 may be gang tacked. Then the welding may be completed as before, by forming short welds 70 simultaneously, and short welds 71 similarly, providing two diametrical bands across the bottom. Other groups 72, 73 of short welds are similarly made, and as many more additional bands as may be desirable, whereupon the gaps between the various short welds are closed.

Figure 12:
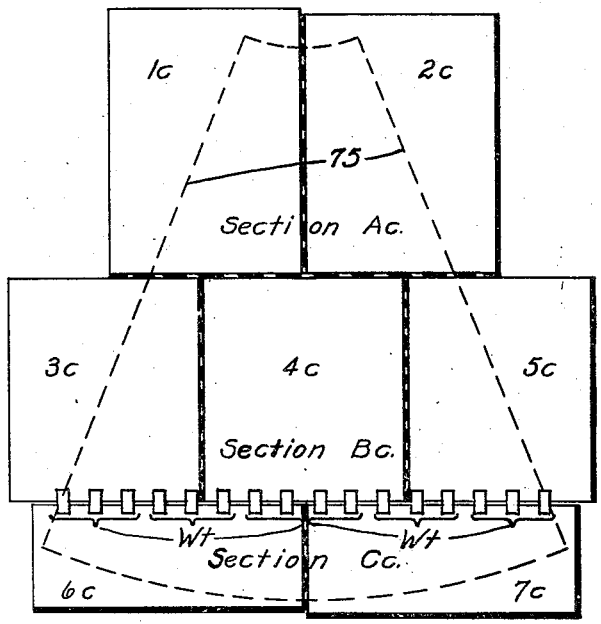

While either of the layouts described or other designs may be employed in building up the roof or crown of a tank, such crowns usually have an appreciable rise and it is preferable to make such crowns in sections which are substantially sectors. Furthermore, it is advantageous to have the plate layout of adjoining sectors of sufficient difference that when joined together the edges thereof will break points, i. e. meet to form T's instead of four edges meeting in a cross. Figs. 11 and 12 diagrammatically illustrate a desirable procedure for tacking the plates of a crown sector. The plates 1c, 2c are clamped together and so adjusted that two of their edges are in line as gaged by the edge of plate 4c, see Fig. 11. The plates 1c, 2c are then simultaneously fusion welded together at spaced points, i. e., gang tacked as previously explained. The sections comprising plates 3c, 4c, 5c and 6c, 7c are similarly gang tacked, whereupon sections Ac and Bc are clamped together and gang tacked, after which the untacked long edge of section Bc is trimmed or bevel cut to match the edge of section Cc, which is gang tacked thereto. With an oxyacetylene torch, this sector may then be bevel cut along the dotted line 75, the removed portions of the plates desirably being of such size that they may be tacked together to form plates for the alternate sectors of the crown.

Figure 13:
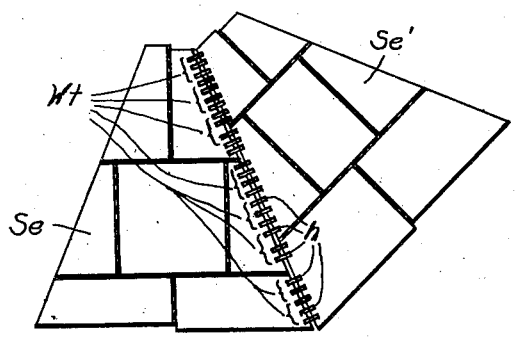
Fig. 13 is a view showing roof sections assembled for tacking.
Figure 14:
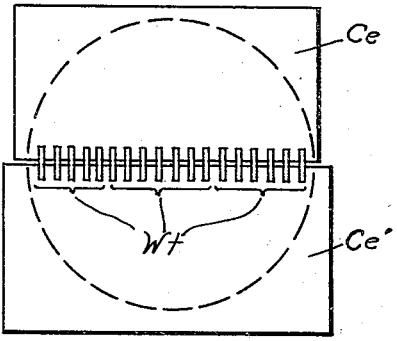
Fig. 14 is a view of the center section of the roof, ready for tacking.
Figure 15:
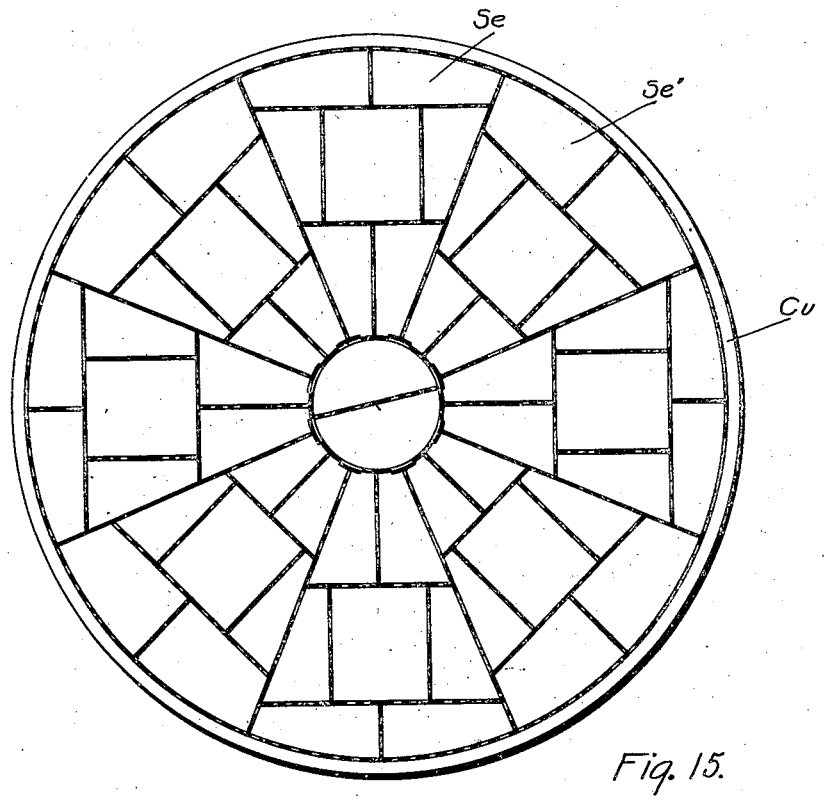
Fig. 15 is a view of a tank crown or roof, with its sections tacked together and to a curb and partially welded.

After the required number of crown sectors, eight in the present example, have been built up and trimmed or cut to match, alternately different sectors Se, Se' are clamped together in pairs and gang tacked as already explained, by welders working simultaneously at points Wt as shown in Fig. 13; the transverse tacked seams thereof being offset to strengthen the structure by breaking joints and avoiding four seams meeting at a point. The pairs of sectors are cut to match and similarly gang tacked in fours, forming two halves of the crown, which halves are next clamped and gang tacked together. The center section of the crown may next be cut from a single plate, or made by gang tacking two plates Ce, Ce' together, as at Wt in Fig. 14, cutting it to shape; and then gang tacking it in postion at the center of the tack welded sectors, its seam breaking joints with the sector seams, as shown in Fig. 15. Next, the perimeter of the crown is cut to receive the curb ring Cu, which is tacked in place and its sections are welded together, substantially following the procedure described in uniting the bottom curb. The crown, having been completely tacked, may next be gang welded, following substantially the same procedure in gang welding it as already described for gang welding tank bottoms.

Figure 16:
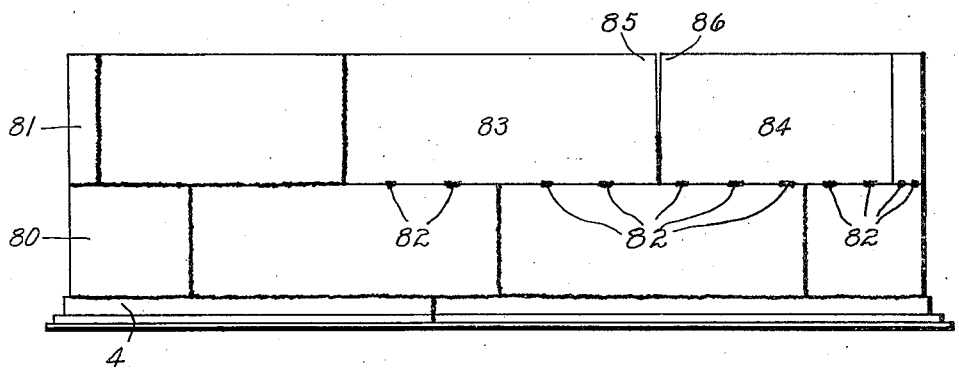
Fig. 16 is an elevation illustrating the tacking and welding procedure for the tank side.

The principles of the present invention may be followed in welding plates together to build up the side of a tank. The lowest row of side plates may be secured directly to the curb by welding instead of by rivets, as shown in Figs. 7 and 8. In Fig. 16, the plates of the lowest row 80 are shown completely welded to the curb and to each other, and the second row 81 is shown partially completed. The plates of the second row are severally gang tacked to the upper edge of the first row, as at 82. The vertical seams between the successive plates may be gang tacked or, as shown, may be welded in the usual manner without previous tacking. Before welding two plates 83, 84, for example, the upper corners 85, 86 thereof are separated so that there will be a space of approximately ¼" per foot of seam between the edges to be united. The seam is then welded, beginning at the bottom and working upwardly, thereby providing a joint substantially free from strains. After the completion of the vertical seams, the seam along the tacks 82 is gang welded to localize the heating effect and stresses as much as possible. The procedure followed in building up the side may be the same for the successive rows of plates, and after the side has been completed the crown curb may be first gang tacked and then gang welded to the top row of side plates to complete a tank as shown in Fig. 17.

Although the present method is independent of the type of welding equipment used, whether gas or electric, it nevertheless has special applicability and special advantages in gas welding. The improved procedure here disclosed substantially reduces the distortion and other difficulties heretofore encountered in welding large structures built up of plates; likewise, the labor and expense are reduced as among other economies it is possible to use mill-run plates, which require a minimum of preparation. While the plates are desirably butt welded, the principles of this invention are equally applicable to lap welded and other types of multi-plate structures, as well as in combination with the welding process disclosed in application Serial No. 709,690 filed April 28, 1924 in the name of Glenn O. Carter.

We claim:

1. A method of fabricating a substantially circular tank wall that comprises tack welding plates together to form sections, tacking such sections together, cutting such tacked-together sections to provide a circular perimeter, uniting a curb to said perimeter, and thereafter completing the weld union of said plates, sections and curb.

2. A method of fabricating a multi-plate structure that comprises preliminarily uniting plates to form sections, preliminarily uniting said sections, depositing weld metal simultaneously at a series of spaced points along a band across said structure, similarly depositing weld metal along other bands crossing said structure and intersecting the first-mentioned band, and finally completing the welding of said plates to one another.

3. A method of fabricating a multi-plate structure according to claim 2 in which such preliminary unions are made by tack welding seams at a plurality of points simultaneously.

4. A method of constructing a tank that comprises preliminarily uniting a plurality of plate sections to form a tank bottom, preliminarily uniting a curb to the perimeter of such bottom, uniting a row of side plates to said curb, and thereafter completing the union of said bottom sections to one another and to said curb.

In testimony whereof, we affix our signatures.

GLENN O. CARTER.
ROBT. B. AITCHISON.
MATTHEW J. WALL.